April 20, 1965  J. W. ROSE ET AL  3,179,461
ATTACH AND RELEASE MECHANISM
Filed March 11, 1963
2 Sheets-Sheet 2
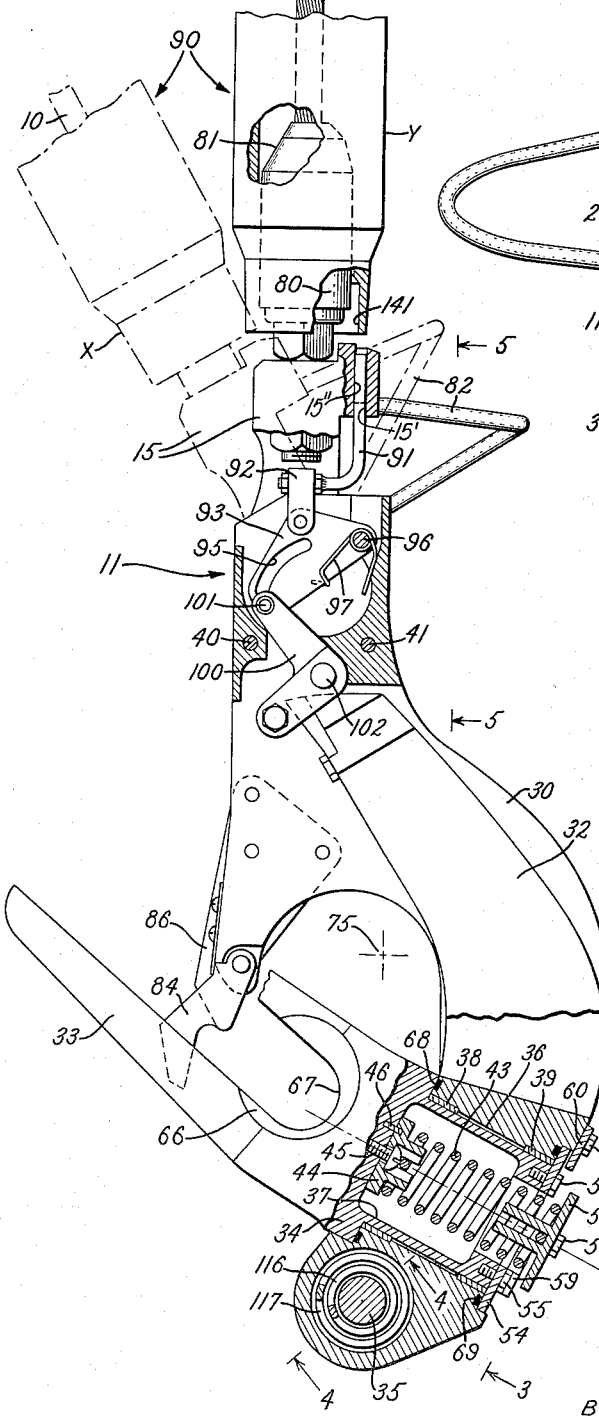
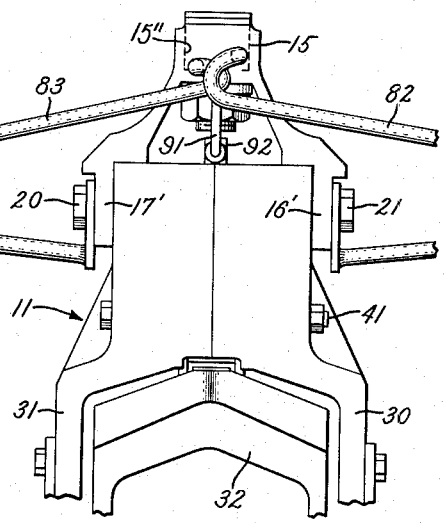
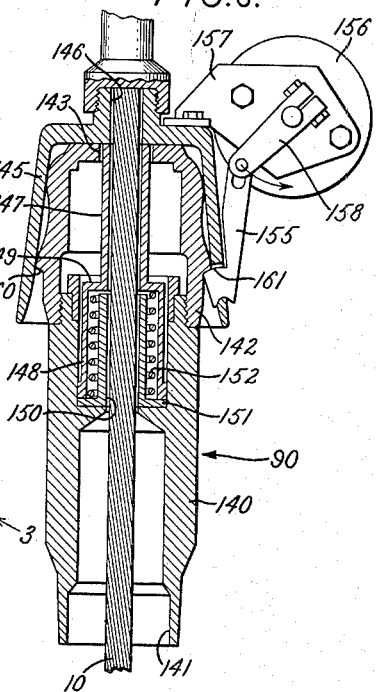
INVENTORS:
Joseph W. Rose,
George S. Thompson,
BY Franklin J. Visek
ATTORNEY.

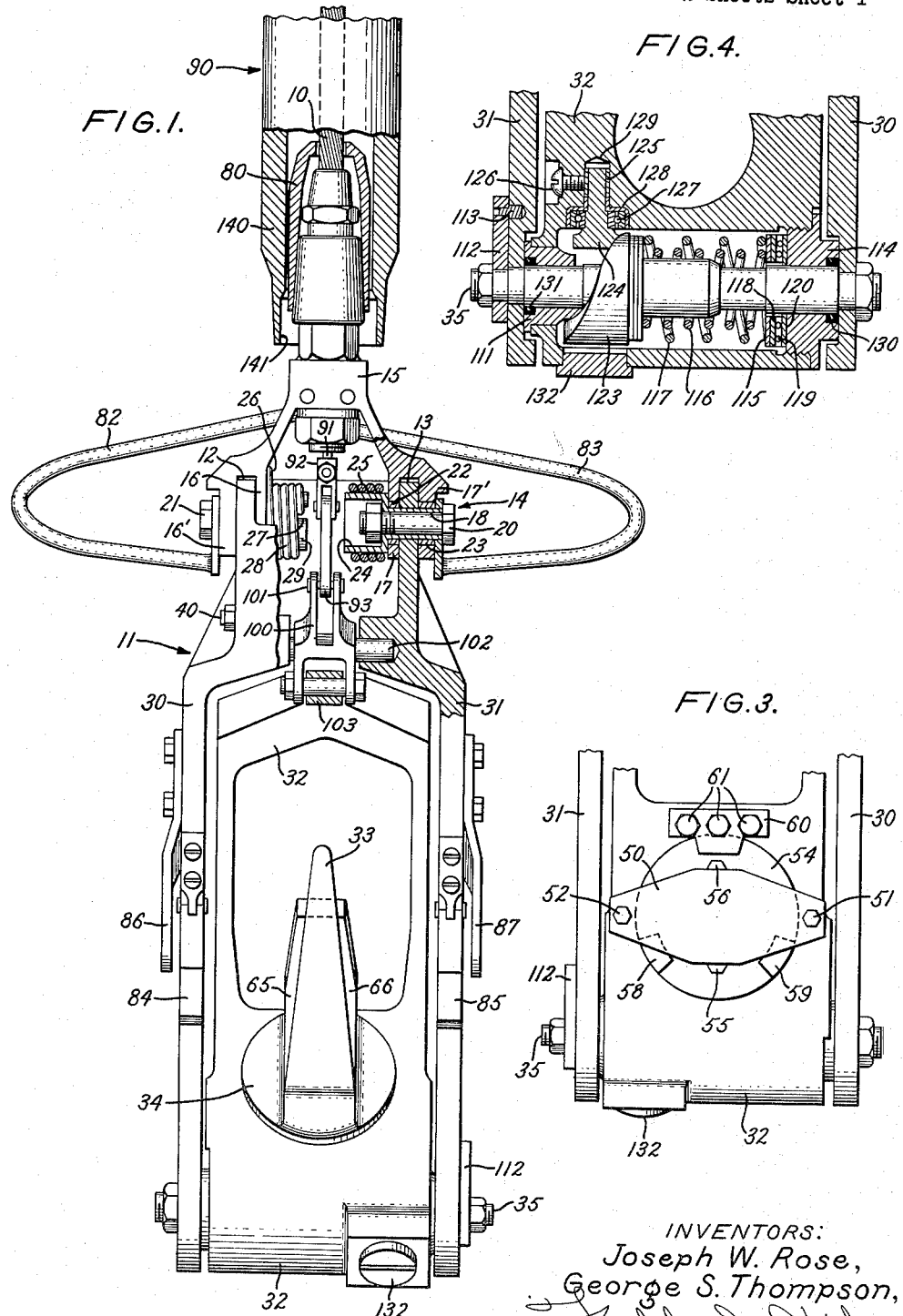

United States Patent Office 3,179,461
Patented Apr. 20, 1965

3,179,461
ATTACH AND RELEASE MECHANISM
Joseph W. Rose, Springfield, and George S. Thompson, Newtown, Pa., assignors to The Boeing Company, Seattle, Wash., a corporation of Delaware
Filed Mar. 11, 1963, Ser. No. 265,312
16 Claims. (Cl. 294—83)

This invention relates to an attach and release mechanism for grasping remote objects and, more particularly, to a cargo hook and tow system for remotely grasping and releasing remote objects.

In general, the cargo hook of this invention employs a flexible cable connected to a remote vehicle and trailed therefrom. The cargo hook is mounted on an extremity of the cable that is remote from the towing or lifting vehicle and employs a frame or housing for mounting a locking or release mechanism that selectively controls a rotatable swing assembly. The swing assembly mounts a rotatable spike hook that is utilized for engaging a remote load, and a return mechanism that returns the swing assembly to its pre-release position after the release mechanism is utilized to allow the swing assembly to drop the remote load.

Numerous advantages are realized through the employment of the cargo hook of this invention that have not heretofore been available. As the hook is trailed or towed through a fluid medium, the hook is aligned so that the spike hook thereof extends in the direction of tow. In this manner, the hook is aligned to grasp a remote tow load. This orientation of the hook is accomplished by stabilizing members, which have a center of pressure above and behind the center of gravity of the hook and therefore cause the hook to properly orient itself. However, if the cargo hook should fail to align the spike hook in the direction of tow because the density of the fluid medium through which it is towed is not sufficient to cause orientation of the hook, guides are employed to rotate the hook into the proper grasping position after initial contact of the guides with the remote tow load to be grasped. Thus, the cargo hook of this invention is completely self-aligning.

The spike hook of this invention is mounted on a cylindrical base which enables limited rotation of the spike hook to an angle with respect to its normal upright position. In this manner, the resisting force of a tow load grasped by the spike hook is maintained approximately perpendicular to the spike hook and prevents damage due to sharp bends in the article or tow cable grasped.

Additionally, the mass of the swing assembly, which rotates to release a tow load, is approximately equal to one half of the mass of the hook. Accordingly, the downward force of the swing assembly, during release of the tow load, is approximately equal but opposite to the upward force or tension of the tow cable that is connected to the towing vehicle. In this manner, when a tow load is released, the hook remains substantially stationary with respect to the towing vehicle because the equal and opposite forces resulting from the movement of the substantially equal but opposite masses of the hook portions cancel each other. Additionally, after a release of a tow load, the spike hook rotates on the cylindrical base to its normal upright position, and the swing assembly returns to its pre-release position.

Accordingly, it is an object of the present invention to provide a cargo hook capable of remotely grasping a load, releasing the load, and subsequently returning itself to its pre-release position.

Another object is to provide a cargo hook which is capable of substantially eliminating load release backlash resulting from load tension exerted in the tow or lift cable that connects the hook to the towing vehicle.

A further object of the invention is the provision of a cargo hook which properly aligns itself for grasping remote loads during movement in air or under water.

Still another object is to provide a cargo hook which aligns itself in a manner so as to maintain its spike hook oriented in the direction of tow while trailing a towing vehicle in a fluid medium.

Another object of the invention is the provision of a cargo hook which aligns itself on contact with a remote load in air so that the spike hook thereof is oriented in the direction of tow for grasping the remote load.

A further object of the invention is to provide a cargo hook which allows rotation of the spike hook in a direction so as to maintain the resisting force of an engaged load approximately perpendicular to the spike hook and prevent damage due to sharp bends in the load grasped.

Other objects and advantages of this invention will be readily perceived from the following description, claims, and drawings.

This invention relates to a cargo hook for handling a remote load including a housing and engagement means rotatably mounted on the housing for grasping the remote load. Means are mounted on the housing for selectively locking the engagement means in a locked position and for releasing the engagement means for rotation, and return means are connected to the engagement means for returning the engagement means to pre-release position.

This invention also relates to an attach and release system in a cargo handling system for grasping and releasing remote loads. The attach and release system comprises a cargo hook, a tow cable connected to the cargo hook, a messenger mounted on the tow cable, and a release system mounted on the tow cable. The cargo hook includes a housing having alignment means for aligning the cargo hook into proper grasping orientation with respect to a remote load and engagement means rotatably mounted on the housing for grasping the remote load and for rotation in a first direction. Also, means are mounted on the housing for selectively locking the engagement means in a locked position and for releasing the engagement means for rotation. The engagement means include means for rotating the engagement means in at least a second direction to a position substantially perpendicular to the resisting force of the remote load, and return means are connected to the engagement means for returning the engagement means to pre-release position. The release system operates a messenger for selectively operating the locking means and includes a receptacle fixed to a towing vehicle for receiving the messenger. The receptacle has a bore therein for traversal therethrough of a tow cable, and latch means are included for locking the messenger in the receptacle. Actuation means are connected to the receptacle for selectively unlocking the messenger for travel thereof along the tow cable to release a remote load grasped in the cargo hook.

The attached drawings illustrate a preferred embodiment of the invention, in which:

FIGURE 1 is a front view partially in section of the cargo hook of this invention;

FIGURE 2 is a side view partially in section of the cargo hook of this invention;

FIGURE 3 is a partial rear view of the lower portion of the cargo hook in the direction of the arrows 3—3 in FIGURE 2;

FIGURE 4 is an enlarged detailed sectional view of the return mechanism of the invention taken along line 4—4 of FIGURE 2;

FIGURE 5 is a partial rear view of the hook of this invention taken in the direction of the arrows 5—5 of FIGURE 2; and FIGURE 6 is a view partially in section of the messenger and mesenger attach and release system of this invention.

Referring to the drawings and particularly FIGURES 1 and 2, the cargo hook assembly of this invention is shown supported by a flexible tow cable 10. The cable 10 is connected to suitable support structure mounted on a towing or lifting vehicle such as an aircraft or surface vessel (not shown).

The cargo hook includes a main housing 11, which is attached through a pivotal torsion spring assembly 14 to a cable fitting 15. The cable fitting 15 provides the means for connecting the hook to the flexible tow cable 10. As can be best seen in FIGURE 1, the spring assembly 14 connects the cable fitting 15 to the hook housing 11 through a tongue and groove hinge. That is, the housing 11 includes tongue members 12 and 13 that are mounted between respective groove forming members or ears 16, 16′ and 17, 17′, respectively, of the cable fitting 15.

Since the spring assembly 14 has two portions which are similar and which cooperate with like tongue and groove connections, only the portion associated with the tongue member 13 and the ear members 17 and 17′ will be described in detail. Mating bores through the tongue member 13 and the ears 17 and 17′ are employed to enable axial insertion therethrough of a bushing 18, which also has a bore therethrough for the insertion of a fastener such as bolt 20. While the bushing 18 is provided in press fit relationship with the bore in the tongue member 13, the bores in the ears 17 and 17′ have a sufficient diameter to receive bushings 22 and 23 therein for allowing the bushing 18 rotational freedom with respect to the ear members 17 and 17′. Accordingly, the bolt 20 serves to align the tongue member 13 with the ear members 17 and 17′, and the bushing 18 cooperates with the tongue member 13 to allow pivotal movement of the housing 11 with respect to the cable fitting 15. Additionally, the bushings 22 and 23 serve to reduce wear caused by the rotation of the bushing 18 relative to the ears 17 and 17′.

A cup-shaped spring guide 24 is formed as an integral part of the bushing 18 and has a torsion spring 25 wound on its external diameter. The internal cavity of the cup-shaped spring guide 24 serves as a container for the nut which mates with the bolt 20 to pivotally mount the cable fitting 15 to the housing 11. The torsion springs of both portions of the spring assembly 14 have a first extremity such as extremity 26 biased against the cable fitting 15 and the other extremity biased against slots such as slot 27 in the spring guides. Accordingly, the torsion springs bias the housing 11 to assume an angle with respect to the cable fitting 15 and the center line of the tow cable 10.

As set forth above both portions of the spring assembly 14 are formed in the same manner. That is, a bolt 21 pivotally unites the tongue member 12 with the ear members 16 and 16′, and the bolt is bushed with bushings such as the bushings 18, 22, and 23. Of course, a spring guide 29 similar to the spring guide 24 is utilized for winding a torsion spring 28 thereon.

In operation, the torsion springs 25 and 28 urge the cable fitting 15 into a canted position with respect to the housing 11 during periods of no load. Thus, as can be seen in FIGURE 2, during periods of no load the cable fitting 15 is canted to the position "X" shown by the dotted lines with respect to the housing 11. However, while towing or lifting a load, the load engaged in the hook counteracts the forces of the torsion springs 25 and 28 to maintain the cable fitting 15 in position "Y" with respect to the housing 11.

The hook housing 11 includes two side plate members 30 and 31, which are connected together at their upper extremities by fasteners such as bolts 40 and 41 (see FIGURE 2). A rotatable member or swing assembly 32 is rotatably mounted on a shaft 35 which is supported between the lower extremities of the side plate members 30 and 31.

As best seen in FIGURE 2, the swing assembly 32 includes a cylindrical bore 36 and a cylindrical base 34 therein. The cylindrical base 34 supports an integral spike hook 33 and is rotatably mounted with respect to the swing assembly 32 by bushings 38 and 39. However, the cylindrical base 34 is restrained from rotation by a torsion spring 43, which is mounted in an internal cavity 37 of the cylindrical base 34. The torsion spring 43 extends axially within the cavity 37 and of the cylindrical base 34 and has one extremity mounted to the cylindrical base 34 by a spring positioner 44, which is fixedly connected to the base 34 by a fastener such as screw 45 and a locking pin 46. The other extremity of the torsion spring 43 is connected to the swing assembly 32 by a spring plate 50 and fasteners such as bolts 51 and 52.

As clearly illustrated in FIGURES 2 and 3, the cylindrical base 34 is rotatably retained in the bore 36 of the swing assembly 32 by a circular retainer plate 54, which is mounted on the cylindrical base 34 by fasteners such as bolts 55 and 56. The retainer plate has a larger diameter than the bore 36 and, with the cylindrical base 34, rotates with respect to the swing assembly 32. Rotation of the spike hook 33 and the cylindrical base 34 is limited by shoulders 58 and 59 formed on the retainer plate 54 (see FIGURE 3). Accordingly, as clearly shown in FIGURE 3, during rotation of the cylindrical base 34, the shoulders 58 and 59 abut a stop plate 60, which is fixedly mounted to the swing assembly or engagement means 32 by fasteners such as screws 61. In this manner, the spike hook 33 is limited in the amount of angular rotation available thereto.

The spike hook 33 includes spherical recesses 65 and 66 on opposite surfaces thereof for receiving a ball (not shown) fixed to a cable to be grasped and thereafter towed. As can be best seen in FIGURE 2, the longitudinal axis or axis of rotation of the cylindrical base 34 is offset from the center of curvature of a cable grasping surface 67 and the spherical recesses 65 and 66 of the spike hook 33. Thus, the resisting forces of a cable grasped by the surface 67 of the spike hook 33 or a ball seated in the recesses 65 or 66 will exert a rotational force to the cylindrical base 34.

Accordingly, the resisting force of a cable grasped by the spike hook 33 will cause the spike hook 33 to rotate and assume a position approximately perpendicular to the resisting force of the cable grasped. In this manner, the cable grasped will not be damaged as a result of sharp bends, which often result from the grasp of a tow cable by a cargo hook. Of course, seals 68 and 69 are employed between the cylindrical base 34 and the swing assembly 32, and between the retainer plate 54 and the swing assembly 32, respectively, to maintain the bushings 38 and 39 free from deleterious effects of environmental conditions in which the cargo hook is utilized.

During cable grasping operations, the side plate members 30 and 31 function as directional stabilizing fins and orient themselves in planes parallel to a vertical plane, which extends in the direction of movement of the hook as the hook is being towed through a fluid medium. That is, the center of gravity of the hook is approximately at point 75 (see FIGURE 2), and the center of pressure of the fluid medium on the side plate members 30 and 31 is to the rear and above the center of gravity.

Accordingly, as the hook is towed through the fluid medium, the hook spike 33 will point in the direction of movement or tow. Should the hook be oriented such that the spike 33 points in a direction other than in the direction of movement of the hook through the fluid medium, the forces of gravity acting on the hook at the center of gravity, and the fluid pressure acting at the centers of pressure of the side plate members 30 and 31 will cause the hook to properly orient the spike hook 33 in the direction of tow. The reason for this is that the center of pressure of the side plate members 30 and 31 are offset from the center of gravity of the hook and the fluid through which the hook is towed causes a rotational force if the members 30 and 31 are not properly oriented. Obviously, the density of the fluid medium through which the hook is towed must be sufficiently great to provide an adequate rotational moment at the towing speed of the towing vehicle. If the density of the fluid medium is not sufficiently large, the side plate members 30 and 31 will not cause the hook to rotate and align itself. Therefore, when the hook is being towed through a fluid medium such as air, additional means may be required to align the spike hook 33 to point in the direction of tow of the cargo hook.

During towing through air, a cap 80 (see FIGURES 1 and 2) is employed over the cable fitting 15. As clearly shown in FIGURE 2, the cap 80 employs a slanted surface 81 providing a smooth non-interfering surface so that the cable to be grasped may slide along the flexible tow cable 10 and down into the throat of the hook spike 33. However, when the hook spike 33 rotates and points in a direction other than in the direction of the cargo hook movement, the cap 80 and the slanted surface 81 also rotate therewith.

Accordingly, as the cable to be grasped slides down the tow cable 10, the cap 80 presents a substantially blunt surface to the cable to be grasped and restricts movement of the hook over the hook so that the hook does not slide over the cable. When the cable to be grasped strikes the blunt surface of the cap 80 a turning moment is induced into the hook and it rotates so that the cable to be grasped is allowed to slide down over the slanted surface 81 of the cap 80 and into the hook spike 33. The reason for this is that during the canted no-load position of the cable fitting 15, which is shown at position "X" (see FIGURE 1), the center of gravity of the hook is offset from the line of action and from the center line of the tow cable 10.

To provide further assurance that the cargo hook will not slide over the cable to be grasped without engaging the cable when the spike 33 points in a direction other than the direction of tow, a pair of cam guides 82 and 83 is fixedly attached to the cable fitting 15. As may be understood by reference to FIGURES 1, 2, and 5, a first extremity of each of the cam guides 82 and 83 is mounted in bores in the rear of an upper extremity of the cable fitting 15. The cam guides extend rearwardly in overlapping relationship and then bend forwardly and downwardly from the upper extremity of the cable fitting 15. As the cam guides 82 and 83 extend forwardly, the other extremities thereof terminate in ear portions that are fixedly held by the bolts 21 and 20, respectively.

Should the blunt edge of the cap 80 fail to sufficiently restrict movement over the hook of the cable to be grasped, the cam guides 82 and 83 will stop the cable. That is, when the cable to be picked up abuts the cam guides 82 and 83, the center of gravity at 75, which is displaced from the center line of the tow cable 10, will induce a rotational moment about the center of gravity as set forth above. This causes the spike hook 33 and the entire cargo hook to reorient itself into the direction of the cable to be grasped. Thus, the cable to be grasped then continues to slide down the face of the cargo hook assembly in an unobstructed manner and is deposited in the spike hook 33.

Keepers 84 and 85 on the hook assembly permit engagement of a cable in the hook opening to the grasping surface 67 of the spike 33 but prevent the cable from escaping therefrom. Additionally, side guards 86 and 87 are utilized to prevent damage to the keepers 84 and 85 should the hook inadvertently strike foreign objects.

As clearly illustrated in FIGURE 2, when it is desired to release a tow load that has been grasped by the spike 33, a messenger 90 is released from the towing vehicle and slides down the flexible cable 10 over the upper portion of cable fitting 15 and into an arcuate slot 15" in the cable fitting. As the messenger enters the arcuate slot 15", it strikes a push rod 91 projecting upwardly into the arcuate slot 15" through a circular aperture 15' provided in the base of the arcuate slot 15". The push rod 91 is connected to a fitting 92 that extends downwardly into contact with a pivotal cam 93, and, when the messenger 90 strikes the push rod 91, the fitting 92 drives the cam 93 about its pivot point. The pivotal cam 93 has a slot 95 therein for engagement with a cam follower 101 mounted between a first pair of arms of a bellcrank 100. Accordingly, when the push rod 91 drives the cam 93, the cam follower 101 cooperates with the slot 95 to rotate the bellcrank 100 about a hinge pin 102 thereof. In this manner, a second pair of bellcrank arms which mount a roller 103 therebetween are rotated from a position abutting the swing assembly 32 to a position that does not obstruct rotation of the swing assembly 32.

The cam 93 is normally biased in an up position by the force of a spring 97 which is mounted on a pin 96 that hingeably connects the cam 93 to the hook assembly housing 11. Accordingly, the bellcrank 100 is normally held in a position as shown in FIGURE 2 so as to abut the swing assembly 32 and obstruct counterclockwise rotation thereof. However, when the messenger 90 strikes the push rod 91, the fitting 92 is depressed and pivots the cam 93 about the hinge pin 96. As the cam 93 pivots about the hinge pin 96, the cam follower 101 cooperates with the cam slot 95 to rotate the bellcrank in a clockwise direction. This drives the roller 103 from its abutting position with respect to the swing assembly 32, and the swing 32 is freed to rotate in response to the downward force exerted by the tow load on the spike hook 33. Release of the tow load is achieved by the energy and the mass of the messenger 90 as it strikes the push rod 91. Additionally, the swing assembly 32 may be damped so that it is limited to one rotation about the shaft 35 when a load is released.

It should be understood that the swing assembly 32 of the hook may be so chosen as to comprise approximately one half of the total mass of the hook. Thus, when a load is released from the hook 33, the downward pivotal motion of the swing assembly 32 offsets the upward motion of the remainder of the cargo hook and minimizes the possibility of a hook release backlash due to the tension of the tow cable 10 under the weight of the tow load. In this manner, a load may be released while the hook is in a very close tow position with respect to the towing vehicle without creating the hazards of a collision between the hook and the towing vehicle when the tow load is released from the hook.

The swing assembly 32 rotates about the shaft 35 and, as is clearly shown in FIGURE 4, is returned to an upright pre-release position by a return mechanism disposed about the shaft 35. The shaft 35 is fixedly mounted to the side plate members 30 and 31 by a lock plate 112 and a pin 113, and the swing assembly 32 includes a pair of bushings 111 and 114 for rotatably mounting the swing assembly on the shaft 35. The bushing 114 is rotatably mounted on the shaft 35 and is threadably secured to assembly 32. Accordingly, the bushing 114 is utilized for allowing entry into the return mechanism and for carrying the loads from the swing assembly 32 to the shaft 35.

A support member 115 is provided on the shaft 35 for receiving the force exerted by a pair of compression springs 116 and 117, which are also mounted to exert force against a cam 123. A bearing race 118, a bearing 119, and a bearing race 120 are placed between the support member 115 and the bushing 114 for minimizing drag upon the rotation of the swing assembly 32 about the shaft 35 when a high degree of force is exerted against the support member 115 by the compression springs 116 and 117.

The compression springs 116 and 117 are positioned in coaxial alignment on the shaft 35 to bear against both the support 115 and the helix cam 123. The springs 116 and 117 permit the cam 123 to slide axially, or in a reciprocating motion, along the shaft 35. While the springs 116 and 117 retard rotation of the cam 123, the shaft 35 may be a hexagonal shaft and the cam 123 may include a hexagonal through bore for insertion on the shaft 35 to insure that the cam 123 does not rotate about the longitudinal axis of the shaft 35.

The cam 123 is maintained in constant contact with a roller 124 by the springs 116 and 117, and the roller 124 rotates when the swing assembly 32 rotates to drive the roller 124 over the cam surface of the cam 123. The roller 124 is rotatably mounted in an upwardly extending bore 129 of the swing assembly 32 and rotates on a bearing 125 and a ball bearing race 127 which is inserted into an insert 128.

It should be understood that the bearing 125 is fixedly held within the bore 129 by a fastener such as screw 126 and the insertion 128 is constructed of a hard material which resists seizure of the ball bearing race 127 with the swing assembly 32. Of course, seals 130 and 131 are employed to eliminate entry into the return mechanism of deleterious environmental conditions.

A plug 132 provides entry into the bottom of the return mechanism to allow insertion of the roller 124 during the assembly of the return mechanism. The plug 132 also allows the insertion into the return mechanism of lubricating and damping oils. Of course, it also should be understood that suitable washers are employed between the side plate member 30 and the seal 130 and between the side plate member 31 and the seal 131 for protection of the seals; washers also may be employed between the bearing race 120 and the bushing 114 to insure equal spacing of the swing assembly 32 from both of the side plate members 30 and 31.

When the roller 103 mounted on the bellcrank 100 releases the swing assembly 32, the swing assembly 32 rotates about the shaft 35 and the roller 124 traverses the cam surface of the cam 123. Accordingly, the cam 123 is driven axially along the shaft 35 and compresses the springs 116 and 117. However, damping fluid in the return mechanism retards axial movement of the cam 123, and, when the rotational energy which is imparted to the swing assembly 32 by the released force has been expended, the compression springs 116 and 117 urge the cam 123 against the roller 124. This causes the swing assembly 32 to return to its upright pre-release position.

As may be seen by reference to FIGURE 6, the messenger 90 employs a weighted body 140 having a bore axially therethrough for insertion on the tow cable 10. The messenger also includes a cup-shaped cap 142 which is adapted at one end to threadably engage the weighted body 140 and has an axial bore 143 through the opposite end thereof. The cap 142 has a lock surface 160 on its external surface for engagement by a lock lever 155. The lock lever 155 extends through an aperture 161 in a receptacle 145 for engaging the lock surface 160 and locking the messenger 90 in the receptacle 145. Accordingly, after the messenger 90 has remotely released the tow load on the cargo hook and after the hook has been retrieved to the towing vehicle, the messenger 90 is automatically drawn into and locked in the receptacle 145.

A plunger, including a pair of cylindrical members 147 and 148, which are interconnected by an annular flange 149, contacts the fixed receptacle 145 through the cap bore 143 when the messenger 90 is drawn into the receptacle 145. Accordingly, the plunger is driven axially of the messenger 90.

A bearing 150 having an annular flange 151 of approximately the same diameter as the outer diameter of the cylindrical member 148 is employed in the messenger 90 to encapsulate a compression spring 152. That is, the compression spring 152 is encapsulated between the inner diameter of the cylindrical plunger portion 148 and the outer diameter of a cylindrical portion of the bearing 150 that is integral with the outer flange 151. Of course, the annular flanges 151 and 149 of the bearing 150 and the plunger, respectively, also serve to encapsulate the spring 152 and act as pressure plates for opposite extremities of the spring. Accordingly, when the hook, with the messenger 90 thereon, is retrieved from a remote area, the cap 142 of the messenger 90 is locked into the receptacle 145 by the lock lever 155, and, as the messenger 90 is drawn into the receptacle 145, the spring 152 is compressed.

While the messenger 90 may be released by operating the lock lever 155 either manually or electrically, a radial solenoid 156 is preferable. That is, energization of the radial solenoid 156, which is mounted on the receptacle 145 by a bracket 157, rotatably drives an arm 158 to pivot and disengage the lock lever 155 from contact with the lock surface 160.

When the lock lever 155 disengages the lock surface 160, the force of the spring 152 acts in equal but opposite directions against the flanges 149 and 151. Since the flange 149 of the plunger is initially held from being driven by the fixed receptacle 145, the flange 151, which bears against the messenger body 140, propels the messenger on the tow cable 10. Accordingly, it may be clearly understood that the use of a spring loaded messenger such as the messenger 90, may be utilized on a substantially horizontal tow cable to release the remote cargo hook. It should also be understood that the bearing 150 is mounted at the approximate center of gravity of the messenger 90 to limit wear from slidable contact of the messenger 90 on the cable 10.

When the cargo hook of this invention releases a remote load, the messenger 90 maintains the cam 93 in a depressed position and the swing assembly 32 maintained in its upright position by the return mechanism. The cam 93 remains depressed by the messenger 90 during hook retrieval and while being held thereagainst in the receptacle 145 by a winch (not shown). However, when the winch allows the cargo hook to lower away from the messenger 90 in the receptacle 145, the spring 97 returns the cam 93 to its up position and the swing assembly 32 is locked from rotation.

From the foregoing it can be clearly understood that this invention encompasses a cargo hook system capable of automatically and remotely grasping and releasing cables during towing or hoisting operations by aircraft or surface vessels. This cargo hook operation may be carried on in the air or under water, and the hook offers the capability of assuring self alignment with respect to the cable to be grasped whether the cable is above or beneath the surface of water. Additionally, the cargo hook of this invention is automatically recocked on being retrieved after each release of a tow load. An additional advantage of this invention is that when a remote load is released from the cargo hook the cargo hook remains substantially stationary with respect to the towing vehicle and the problem of a load release backlash is minimized. Furthermore, the force of a tow load on the hook is exerted through the bellcrank 100 in a direction transverse to the direction of the cam portion of the cam 93. In this manner, the cam follower 101 is locked into position, and additional components such as springs are not needed to keep the hook from accidental release while under load.

For purposes of exemplification, a particular embodiment of the invention has been shown and described according to the present understanding thereof. However, it will be apparent that changes and modifications in the arrangement and construction of the parts thereof may be resorted to without departing from the spirit and scope of the invention.

We claim:

1. A cargo hook for handling a remote load comprising a housing, said housing having alignment means for aligning said cargo hook into proper grasping orientation with respect to the remote load, engagement means rotatably mounted on said housing for grasping the remote load and for rotation in a first direction, means mounted on said housing for selectively locking said engagement means in a locked position and for releasing said engagement means for rotation, said engagement means including means for rotating at least a part of the engagement means in at least a second direction substantially perpendicular to the resisting force of the remote load, and return means connected to said engagement means for returning said engagement means to pre-release position.

2. A cargo hook for handling a remote load comprising a housing including first alignment means; connecting means for connecting said housing to a tow cable; pivot means for pivotally connecting said connecting means to said first extremity of said first alignment means; second alignment means mounted on said connecting means; mounting means fixedly connected to a second extremity of said first alignment means; first rotatable means mounted on said mounting means for rotation thereon and including second rotatable means mounted on said first rotatable means and grasping means mounted on said second rotatable means for grasping the remote load; locking means mounted on said housing for abutting said first rotatable means to selectively lock said first rotatable means for rotation about said mounting means; and return means mounted on said mounting means for controlling rotation of said first rotatable means about said mounting means and for returning said first rotatable means to pre-release position.

3. A cargo hook as claimed in claim 2 wherein said pivot means comprises bushing means extending through the upper extremities of said first alignment means and through the lower extremities of said connecting means, and spring means mounted on said bushing means to urge said connecting means into a canted position with respect to said alignment means whereby the center of gravity of said cargo hook is offset from the center line of the tow cable during no-load condition.

4. A cargo hook as claimed in claim 3 wherein said second rotatable means comprises a cylindrical base member rotatably mounted for rotation about the longitudinal axis thereof in said first rotatable member, said cylindrical base member being connected to said grasping means at a first longitudinal extremity, said grasping means having a main load carrying surface offset from the longitudinal axis of said cylindrical base member whereby said grasping means rotates with said second rotatable means to a position substantially perpendicular to the resisting force of the remote load.

5. A cargo hook as claimed in claim 4 wherein said second rotatable means further comprises a retainer plate connected to the second longitudinal extremity of said cylindrical base member, a stop plate mounted on said first rotatable means, contact means on said retainer plate for contact with said stop plate to limit rotation of said cylindrical base member, and a spring axially mounted in said cylindrical base member, said spring being connected at a first extremity thereof to said first extremity of said cylindrical base member and at a second extremity thereof to said first rotatable means.

6. A cargo hook as claimed in claim 4 wherein said return mechanism comprises cam means mounted in nonrotatable relationship on said mounting means for axial movement thereon, roller means mounted on said first rotatable means for engagement with said cam means when said first rotatable means rotates about said mounting means, and spring means mounted axially on said mounting means between said cam and said first rotatable member for resisting axial movement of first cam means on said mounting means whereby said cam means is driven axially along said mounting means by said roller means during rotation of said first rotatable means and returned to pre-release position in response to said spring means.

7. A cargo hook as claimed in claim 6 wherein said locking means comprises a bellcrank, weighted means slidably mounted on the tow cable, rod means mounted on said connecting means, second cam means pivotally mounted on said first alignment means and connected to said rod means, bias means mounted on said second cam means for biasing said second cam means and said rod means in an up position, said bellcrank being pivotally mounted on said first alignment means and having first arm means responsive to said second cam means for locking said bellcrank from rotation when said second cam means is in an up position and releasing said bellcrank for rotating when said weighted means contacts with said rod means, said bellcrank having second arm means abutting said first rotatable means when said second cam means is in an up position whereby when said weighted means contacts said rod means said rod means pivots said second cam means and drives said bellcrank from its abutting position with respect to said first rotatable means.

8. A cargo hook as claimed in claim 2 wherein said second alignment means further comprises first and second cam guides, said first and second cam guides being connected at the first extremity thereof to an upper extremity of said connecting means and said second extremities of said cam guides being connected to a lower extremity of said connecting means and spaced apart transversely of said cargo hook, said first and second cam guides extending rearwardly from the upper extremity of said connecting means and curving to said lower extremity of said connecting means whereby contact of said cam guides with a load to be grasped causes rotational orientation of said cargo hook due to the offset center of gravity with respect to the center line of the tow cable.

9. A cargo hook as claimed in claim 2 wherein said second alignment means further comprises a cap on the tow cable and connected to said connecting means, said cap having a slanted surface aligned with the grasping means for allowing free unobstructed movement thereover of a remote load to be grasped, said cap further having a substantially blunt arcuate surface connected at the arcuate limits thereof to said slanted surface for obstructing movement of said load to be grasped when said grasping means is not correctly aligned for grasping the remote load.

10. A cargo hook as claimed in claim 2 wherein said first alignment means comprises a first stabilizing side plate member and a second stabilizing side plate member, said first and second stabilizing side plate members extending parallel with respect to each other and connected at the upper extremities thereof to said connecting means and at the lower extremities thereof to said mounting means, said first and second side plate members further having a center of pressure in a fluid medium offset rearwardly with respect to said center of gravity of said cargo hook whereby said cargo hook is stabilized with said grasping means oriented for grasping in the direction of tow through a fluid medium.

11. A cargo hook as claimed in claim 10 wherein said first rotatable means, said second rotatable means, and said grasping means comprise approximately one half of the total mass of said cargo hook to thereby create during load release an approximately equal downward force with respect to the upward force created by the loss of tension on the tow cable by the tow load whereby load release backlash is substantially minimized.

12. A cargo hook as claimed in claim 7 wherein said weighted means comprises a body member having an axial bore therethrough for traversal of said tow cable, a plunger slidably mounted on said axial bore of said body member, a compression spring encapsulated within said body member by said plunger, a bell-shaped sleeve threadably connected to said body member, said bell-shaped sleeve having a bore therethrough for traversal of the tow cable, said plunger having an axial bore and being mounted on the tow cable, said plunger including a portion having an outer diameter smaller than the bore in the bell-shaped sleeve for being urged against a fixed member to compress said spring whereby release of said weighted member from the fixed member propels the weighted member along the tow cable in response to the expanding force of the spring.

13. In a cargo handling system an attach and release system for grasping and releasing remote loads comprising a cargo hook including a housing, said housing having alignment means for aligning said cargo hook in the proper grasping orientation with respect to a remote load, engagement means rotatably mounted on said housing for grasping a remote load and for rotation in a first direction, means mounted on said housing for selectively locking said engagement means in a locked position and for releasing said engagement means for rotation, said engagement means including means for rotating at least a portion of said engagement means in at least a second direction to a position substantially perpendicular to the resisting force of a remote load, and return means connected to said engagement means for returning said engagement means to the pre-release position; a tow cable having one extremity connected to said cargo hook; a messenger mounted on said tow cable; and a release system mounted on said tow cable for selectively operating said locking means including a receptacle fixed to a towing vehicle for receiving said messenger, said receptacle having a bore therein for traversal therethrough of said tow cable, latch means for locking said messenger in said receptacle, and actuation means connected to said receptacle for selectively unlocking said messenger for travel along said tow cable to release a remote load grasped in said cargo hook.

14. A cargo hook for handling a remote load comprising a housing, said housing having alignment means for aligning said cargo hook into proper grasping orientation with respect to the remote load when moved through a fluid medium, engagement means for grasping the load, mounting means rotatably mounting said engagement means on said housing, means mounted on said housing for selectively locking said engagement means in a locked position and for releasing said engagement means for rotation, and return means mounted on said mounting means and connected to said engagement means for returning said engagement means to pre-release position, said return means having cam means mounted on said mounting means in nonrotatable relationship for axial movement thereon, roller means mounted on said engagement means for engagement with said cam means when said engagement means rotates about said mounting means, and spring means mounted on said mounting means in juxtaposition to said cam means for resisting axial movement of said cam means whereby said cam means is urged to move axially along said mounting means by said roller means during rotation of said engagement means and returns said engagement means to pre-release position in response to said spring means.

15. A cargo hook for handling a remote load comprising a housing, said housing having alignment means for aligning said cargo hook into proper grasping orientation with respect to the remote load when moved through a fluid medium, engagement means for grasping the load, mounting means rotatably mounting said engagement means on said housing, means mounted on said housing for selectively locking said engagement means in a locked position and for releasing said engagement means for rotation, and return means mounted on said mounting means and connected to said engagement means for returning said engagement means to pre-release position, said engagement means having first rotatable means mounted on said mounting means for rotation thereon including second rotatable means mounted on said first rotatable means and hook means mounted on said second rotatable means for grasping the remote load, said second rotatable means including a cylindrical base member rotatably mounted for rotation about the longitudinal axis thereof on said first rotatable means, said cylindrical base member being connected to said hook means at a first longitudinal extremity, said hook means having a main load carrying surface offset from the longitudinal axis of said cylindrical base member whereby said hook means rotates with said second rotatable means to a position substantially perpendicular to the resisting force of the remote load.

16. A cargo hook for handling a remote load comprising a housing, said housing having alignment means for aligning said cargo hook into proper grasping orientation with respect to the remote load when moved through a fluid medium, engagement means for grasping the load, mounting means rotatably mounting said engagement means on said housing, means mounted on said housing for selectively locking said engagement means in a locked position and for releasing said engagement means for rotation, and return means mounted on said mounting means and connected to said engagement means for returning said engagement means to pre-release position, said means for selectively locking said engagement means including a bellcrank, weighted means slidably mounted on a tow cable, rod means mounted on said housing, cam means pivotally mounted on said housing and connected to said rod means, bias means mounted on said cam means for biasing said cam means and said rod means in an up position, said bellcrank means pivotally mounted on said housing and having first arm means responsive to said cam means for locking said bellcrank from rotation when said cam means is in an up position and for rotating said bellcrank in response to contact of said weighted means with said rod means, said bellcrank having second arm means abutting said engagement means when said cam means is in an up position whereby when said weighted means contacts said rod means said cam means connected thereto pivots and drives said bellcrank from its abutting position with respect to said engagement means.

References Cited by the Examiner
UNITED STATES PATENTS

| | | | |
|---|---|---|---|
| 905,576 | 12/08 | Porter | 294—83 |
| 1,434,991 | 11/22 | Carey | 294—83 |
| 2,761,727 | 9/56 | Moore | 294—111 X |

SAMUEL F. COLEMAN, *Primary Examiner.*

ERNEST A. FALLER, *Examiner.*